3,016,355
Patented Jan. 9, 1962

3,016,355
ACTIVATION OF CLAY BY ACID TREATMENT, SUPPLEMENTARY TREATMENT AND CALCINATION
Alfred J. Robinson, Bound Brook, Aldo P. Allegrini, Westfield, and Albert J. Mueller, Princeton, N.J., assignors to Minerals & Chemicals Philipp Corporation, a corporation of Maryland
No Drawing. Filed Oct. 21, 1957, Ser. No. 691,152
5 Claims. (Cl. 252—424)

This invention relates to an improved method of preparing catalysts for use in hydrocarbon conversion processes from naturally-occurring acid-activatable clays, particularly kaolin clays. In essence, the invention is an improvement over the method disclosed in the copending U.S. patent application of Serial No. 490,128, filed February 23, 1955, now U.S. Patent No. 2,967,157, by Alfred J. Robinson and James V. Weir, an embodiment of which relates to the preparation of relatively coarse catalyst particles, ranging in size from about 10-mesh to 4-mesh and usually in the form of pellets. The term "pellets," as used throughout the specification and claims, except as otherwise indicated, is intended to include within its meaning not only extruded pellets but other suitably shaped masses within the proper size range which have been formed by methods well-known to those skilled in the art. Such catalyst particles are used in the well-known fixed and moving bed processes. In said copending application there is disclosed an improved process for the preparation of adsorptive contact masses from naturally-occurring acid-activatable clays, particularly kaolin clays. In its preferred embodiment, the process involves mixing clay and sulfuric acid together to produce a plastic mass, forming appropriately sized masses, as for example by extrusion, from said plastic mass, aging the clay-acid masses, preferably in an enclosed, air-filled space to minimize changes in the moisture content of said masses for a period of time and at temperature sufficient to permit substantial reaction between the clay, particularly the alumina of said clay, and the acid, and calcining the aged clay-acid masses at a temperature level sufficiently high to decompose aluminum sulfate which formed in situ therein during the aging and to thereby convert said masses to high quality adsorptive contact masses especially suitable as hydrocarbon cracking catalysts.

The process disclosed in the aforesaid copending application as pointed out therein, represent a radical departure from the well-known prior art acid leaching methods of activating clays, particularly sub-bentonite clays, to thus convert them to a form in which they are suitable as adsorptive contact materials. These prior art acid leaching methods comprise essentially the basic steps of reacting the clay with dilute acid, usually dilute sulfuric acid, to convert part of said clay to a water soluble form and then leaching or washing substantially all of the resulting water-soluble material from the clay-acid reaction product with water, leaving behind a residue from which is obtained the final product and which is of different chemical composition from the starting clay since a portion of said clay has been removed in the leaching step. In the novel process of the copending Robinson and Weir application, on the other hand, the clay is reacted with sulfuric acid and then the clay-acid mixture is calcined to decompose water soluble products of the reaction, which products correspond substantially to those leached from said mixture in the prior art acid leaching methods, and to convert said mixture to a material suitable for adsorptive contact purposes which material is substantially the same in chemical composition as the starting clay, on a volatile free basis, but of enhanced activity. The prior art acid leaching processes can be considered wet methods of clay activation since they entail an aqueous leaching step, whereas the processes of the copending Robinson and Weir applications can be considered dry ones in that they do not require aqueous leaching of the clay-acid reaction product for removal of its water soluble portion.

It is highly desirable in hydrocarbon conversion units to produce from any given feed stock high yields of such desired liquids as motor fuels with relatively low production of by-product gas and coke, the generation of the latter in particular representing an economic loss to the operator of a unit. Furthermore, the catalyst must be periodically renewed or replaced when the coke deposited thereon decreases the activity of the catalyst, this adding considerably to processing costs. Hence, any decrease in coke deposition is concomitant to less frequent requirement to regenerate or replace catalyst. A small reduction in coke value, expressed as ratio of coke formed to total converted materials, reflects a substantial improvement in the economics of the conversion process. In general the quantity of coke deposit increases with increasing conversion level and it is advantageous to employ a catalyst which generates a relatively small coke deposit at a high conversion level. The performance of catalysts in a hydrocarbon conversion unit may be compared by ratings based upon the amount of coke formed in the process at a specific level of conversion.

Accordingly, it is an object of the present invention to provide an improved process for preparing catalysts from kaolin clay which catalysts display low coke-producing properties in hydrocarbon conversion units.

Other objects and advantages of the invention will be apparent from the description thereof which follows.

We have found that an improved catalyst having low coke-producing properties when used in a petroleum hydrocarbon conversion unit may be prepared by a modification of the aged clay-acid masses produced according to the practices taught in the above-mentioned copending application prior to the calcination thereof. Briefly, the invention resides in the improvement in the aforementioned dry process for producing catalyst from kaolin clay which comprises at least partially dehydrating aged acid-clay masses to remove at least a part of the bound water and thereby promote porosity in said aged acid-clay masses, filling the pores or interstices thus formed with a carbonizable liquefiable or liquid organic material and heating the clay-acid masses including interstitial organic material to form coke, amorphous carbon or other thermal degradation products consisting essentially of carbon in situ on the surface and throughout the pores of said masses. The terms "carbon deposit" or "carbon-coated" or "carbon," as used hereinafter refer to a thermal degradation product consisting essentially of carbon and are meant to include carbon in one of its amorphous forms, graphitic form or coke. Such carbon-coated masses when subject to calcination provide catalyst particles exhibiting reduced coke-producing tendency when used in the well-known hydrocarbon conversion processes.

This process is to be distinguished from a process in which carbon or other combustible fillers are added to a clay-acid mixture prior to the formation of shaped masses from said mixture whereby during the combustion of the filler voids are introduced. The process of the instant invention, on the other hand, is directed to the promotion of voids in shaped masses by removal of bound water and the introduction of a carbonaceous deposit on the surface of said existent voids; catalysts prepared according to practices herein taught differ from those catalysts in which carbon or combustible filler are added prior to calcination principally with respect to their reduced coke-producing tendencies when used in hydrocarbon conversion processes.

Although we do not wish to be bound by the hypothesis set forth, it is felt that the surprising results, i.e. the reduced coke-producing tendency of the pellets produced, are due to the fact that the ensuing calcination operates in a reducing atmosphere due to the substantially uniformly distributed interstitial carbon. It will be shown that the mere promotion of porosity prior to calcination without the deposition of a carbonaceous deposit in the voids is not responsible for the outstanding product distribution displayed by the catalysts produced by the practices taught herein.

As previously noted, the process of the present invention is intended primarily for use on kaolin clays, by which is meant those naturally occurring clays containing in the raw state as the principal clay constituent therein kaolinite, halloysite, indianite, dickite, nacrite or anauxite. These clay minerals in their uncalcined form may be represented by the formula: $Al_2O_3 \cdot 2SiO_2 \cdot 2H_2O$. The weight ratio of $SiO_2$ to $Al_2O_3$, indicated by this formula, is 1.18 and kaolin clays normally possess $SiO_2/Al_2O_3$ ratios of from 1.0 to 1.5.

While we prefer to use degritted raw clay (that which has been refined only to the extent that grit, foreign bodies and clots of undispersed clay have been eliminated) as a starting material in our process, we wish to have it clearly understood that the invention is not limited to the treatment of such a product. Clays which have received other preliminary treatments may still be amenable to processing in accordance with teachings herein. Examples of preliminary treatments falling within this category are deironing by physical or chemical methods, conventional classifying operation, and even partial acid activation by the previously mentioned wet procedures. The volatile matter content (V.M.) of the starting clay should preferably not be so high as to make too dilute a mixture of clay and acid for optimum handling under the conditions of the particular processing involved. I have obtained excellent results using a starting clay of about 14 percent V.M. with moderate dosages of concentrated sulfuric acid. By volatile matter (V.M.) is meant that part of the clay which would be eliminated by heating said clay at a temperature of about 1700° F. to substantially constant weight. The weight of the clay without its volatile matter is referred to as the volatile free (V.F.) of said clay.

In putting the process of my invention into practice, a naturally-occurring clay, as for example kaolin clay, and sulfuric acid are first mixed to an appearance of homogeneity in any apparatus suitable for the purpose, as for example a pug mill. The clay-acid mixture is then extruded to form pellets, or otherwise shaped into masses within the desired size range. Next, the pellets or shaped masses are aged under such conditions of time and temperature as to bring about substantially complete reaction between the clay and the acid, the preferred aging medium being a hydrocarbon oil as disclosed in the copending application of Serial No. 499,515, now abandoned. This aging of the pellets, or other shaped masses may be accomplished, for example, in a screw conveyor by conveying said pellets or masses, while immersed in the hydrocarbon liquid at the desired temperature level, therethrough at a rate such as to afford adequate time for substantially complete reaction between clay and acid. It will be understood, however, that the clay-acid masses may be aged in any other suitable manner, as for example in an enclosed, air-filled space designed to minimize changes in the moisture content of pre-shaped clay-acid mass, as taught in said copending application of Serial No. 490,128.

The aged pellets are then substantially dehydrated and the interstices formed in the pellets by the dehydration are filled with a carbonizable organic material and the pellets including interstitial organic material are heated in a reducing atmosphere to effect substantially complete formation in situ of carbon in the interstices.

The aged, carbon-coated pellets are finally subjected to a calcination treatment at elevated temperatures in an atmosphere of steam and flue gas to effect desulfation thereof with attendant conversion of said pellets to masses particularly suitable as hydrocarbon cracking catalysts.

We prefer to use concentrated sulfuric acid, such as the commercially available 66° Bé. (about 93 percent $H_2SO_4$) grade, for the clay-acid reaction of our process, water being added, if necessary, to facilitate ease of pugging, or otherwise mixing, the ingredients. However, any strength acid consistent with proper plasticity of mix for the dosage employed can be used within the scope of our invention. We prefer to use acid dosages from about 60 percent to about 100 percent in our process, acid dosage being defined as the weight of 100 percent acid per weight of volatile free clay expressed on a percentage basis.

Although acid dosages much lower than 60 percent, down to as low as 20 percent in fact, can be used in our process with some benefit, the conversion of the acid reactable constituents of the clay gradually falls off with decreasing dosage until ineffectual levels are reached. With the lower dosages of acid, it has been found necessary to have higher water/acid ratios in the mix than will suffice for more normal dosages, the principal reason for this being to adjust the said mixes to conditions of optimum plasticity for working. When a 20 percent dosage is employed, for example, good plasticity is attainable with a dilute acid of only 50 percent $H_2SO_4$ concentration. On the other hand, very high acid dosages, particularly on clays of relatively coarse particle size, sometimes produce mixtures too thin for adequate workability. In this event, the situation can frequently be remedied by either grinding the clay prior to acid addition or by substituting fuming sulfuric acid for the more dilute acid conventionally used. Although our preferred range of acid dosage has been given as that from about 60 percent to about 100 percent, dosages higher than 100 percent can be used within the scope of our invention so long as a workable mix is obtainable in the process. Approximately 130 percent dosage represents the amount of acid that would be theoretically required for substantially complete reaction with an average kaolin clay, although amounts in excess of this can be used within the scope of our invention.

As previously indicated, the mixture of clay and acid is formed into masses of appropriate size by extrusion or equivalent method before the aging step. The forming operation can be performed by extrusion, pilling or any equivalent method known to those skilled in the art, our preferred method being extrusion by means of an auger mill. For best results in extrusion, the V.M. of the mix should be between about 30 and about 65 percent, with the preferred range being from 50 to 55 percent.

When the pellets are aged in a hydrocarbon liquid it should be one which is substantially non-reactive with sulfuric acid, at the aging temperature level, although minor amount of matter capable of reacting with the acid can be tolerated therein. These hydrocarbon liquids should preferably have low vapor pressures at the aging temperatures, but we do not wish to exclude the possibility of using lower boiling materials in conjunction with a condenser system to prevent loss of vapors. Examples of readily available hydrocarbon liquids which are suitable for our process are saturated aliphatic higher molecular weight hydrocarbons which have been treated with sulfuric acid for removal of sulfonatable components such as, for example, certain white mineral oils. Kerosene can also be used as the aging medium if condenser systems are available.

Optimum temperatures for our oil aging fall between the limits of about 220° F. and about 400° F. and optimum times within the range from about 1 to about 24 hours, with the times required depending on the temperatures used. We prefer to age within the temperature range from 275° to 325° F. for a period of from about 1 to about 5 hours. When aging temperatures become too high, the clay-acid reaction proceeds rapidly and the final product is excessively soft. When aging temperatures are too low, the product is also soft but in this case the cause seems to stem from insufficient reaction due to a very slow reaction rate. The hydrocarbon liquid in which the pellets are aged may be subjected to a preliminary conditioning treatment for the purpose of effecting substantial improvement in the hardness of the final contact masses.

The dehydration of the aged acid-clay pellets is accomplished by subjecting them to a temperature from about 450° to 1000° F., and preferably from about 500° to 600° F. for sufficient time, usually about an hour, to remove a substantial portion of bound water, thus introducing voids in the mass and to deposit as carbon substantially all of the aging oil associated with the pellets. When the masses are aged in air or other non-carbonaceous medium, no coke will be produced during this dehydration step. Beyond the preferred temperature range some desulfation takes place whereas at temperatures below about 500° F. the dehydration may be insufficient for the purposes of the invention. The dehydration is performed in any suitable externally fired furnace.

The pellets, at least partially dehydrated, are conveyed to a vat or the like wherein they are soaked in a carbonizable liquid or liquefiable organic material, preferably at somewhat elevated temperature, to lower the viscosity of the soaking material and thereby facilitate entry of the fluid into the voids within the pellet. Suitable soaking materials include those hydrocarbons which have negligible vapor pressure at room temperature and which are devoid of certain metallic substituents or contaminants, and which essentially burn ash-free. Metallic constituents such as vanadium, copper, nickel and iron are catalyst poisons and alkalies act as fluxing agents during the calcination to which the pellets are eventually subjected. Particularly suitable fluids for the purpose from the standpoint of performance and economy include kerosene, mineral oil, naphtha and gas oil (such as is used as feed to catalytic cracking units) or mixtures thereof. Other organic liquids useful for the purpose include distilled tall oil, relatively high-molecular weight alcohols, rosin acids, etc., which liquids are devoid of certain metallic substituents or contaminants and burn essentially ash-free. The soaking temperature is preferably below the boiling point of the soaking liquid although a condenser may be used when at the temperatures employed the liquid has a high vapor pressure. The maximum soaking temperature is determined by the flash point of the soaking fluid. Excess soaking fluid may, for the sake of economy, be drained from the pellets prior to carbonization of soaking fluid entrained in the pellets. The soaked pellets are heated in a reducing atmosphere to effect carbonization of the soaking fluid in situ within the core of the pellet, the temperature and time for this heating being dependent on the composition of the soaking fluid. Where gas oil is the soaking fluid, this operation will satisfactorily be carried out between about 500° and 600° F., a draftless, externally fired rotary furnace being particularly suitable to accomplish this coking.

In the calcination of the aged pellets, to effect their desulfation, we have found that for best results the temperature should be between the limits of about 900° and about 1600° F. and the calcination time should preferably be not greater than about 24 hours. The term "calcination" as used above and hereinafter throughout the specification and claims refers to a high temperature roasting process, in which the temperature is sufficiently high to reduce salts to their corresponding oxides. The term is to be distinguished from other heating processes carried out at lower temperature levels. The temperature and time of calcination will depend to a large extent on the atmosphere within the furnace in which the pellets are calcined. Although we do not wish to be limited to any atmosphere in the furnace we prefer to use steam or combinations of steam and reducing flue gases. While calcination temeratures outside of the range disclosed are not excluded, we would like to make clear that at temperatures much below 900° F. the aluminum sulfate decomposition may be incomplete and that temperatures above 1600° F. may result in lowered activity of the final product.

It is within the scope of our invention to incorporate not more than about 10 percent, on a total weight of mix basis, of a combustible filler into the clay-acid mixture of our process prior to formation of the said mixture into shaped masses. This filler, among other things, serves to increase the porosity of the final catalyst since it is eliminated during the calcination step, or in some cases during the dehydration step, leaving voids behind. Examples of filler suitable for our purpose are wood flour, corn meal, sawdust, carbon and the like.

Catalyst samples, prepared both by the process of the present invention and by the process of the copending application of Serial No. 499,515, were evaluated for their influence on product distribution characteristics, in general, and coke promoting tendencies in particular, in a "Fluidized Fixed-Bed Catalytic-Cracking Unit." For use in the test powdered catalyst samples were tested under fluidizing conditions. For use in the test unit pelleted catalyst samples were ground to powders and tested under fluidizing conditions. In accordance with this test method preheated crude oil feed stock and an inert diluent gas were passed upward through a bed of catalyst at a desired temperature for a given process period.

Metered feed and diluent gases were passed through a preheater, where the feed was vaporized, and entered the reactor tube. A weighed quantity of powdered catalyst was fluidized by the feed and the diluent, and the reaction products passed up through the reactor tube and were led out through a line which served also as an air-cooled partial condenser. The condensed liquid product was collected in a glass kettle immersed in a dry-ice-acetone mixture, and the uncondensed gases passed through a distillation column, micro vapor dividing head (cooled to $-30°$ C.), two cold traps, a soda lime tower, a wet test meter, and were finally stored in a gas holder.

At the end of the processing period metered stripping gas (usually helium) was introduced into the reactor to carry over additional gas and liquid products.

The regeneration of the catalyst was a process of burning coke off the catalyst by passing air over the hot catalyst which had been gas stripped of additional gas and liquid products. The air reacted with the carbon and hydrogen in the coke on the catalyst, yielding $CO$, $CO_2$ and $H_2O$. The $CO$ was converted to $CO_2$ in a furnace having a tube containing $CuO$ which was heated to about $625 \pm 25°$ C. Regeneration was started by passing air through the reactor at about 1800 cc./minute and at a temperature of $590°$ C.$\pm 10°$ C. with regenerated gas going through weighted towers (1 Drierite tower, 2 soda lime towers, and 1 Ascarite tower). Gas flowed through the Drierite tower (to remove any water vapor present) and then, divided into two equal streams, passed through two soda lime towers, which were connected in parallel, the latter towers absorbing $CO_2$. The regeneration was complete within 2 to 2½ hours. Completion of regeneration was checked by pouring about 20–30 cc. of saturated $Ba(OH)_2$ solution into a bottle and bubbling part of the regenerated gas through this solution for about 30 seconds. The appearance of a white precipitate indicated incomplete regeneration.

The calculation of the weight hourly space velocity (WHSV), which is a measure of the rate of flow of liquid feed through the catalyst, is made as follows:

$$WHSV = \frac{\text{Weight of feed flowing/hour, (grams/hr.)}}{\text{Weight of catalyst, (grams)}}$$

The weight of coke is calculated by adding the weight of hydrogen present in the water absorbed by the Drierite to the weight of carbon present in the $CO$ absorbed by the Ascarite and soda lime. The coke yield is calculated as follows:

Absolute coke yield = $\dfrac{\text{Weight of coke formed} \times 100}{\text{Weight coke} + \text{weight of liquid products} + \text{weight of gaseous products}}$ The following examples are given to further illustrate the invention and are not to be construed as limiting the scope thereof.

In the examples the absolute coke yields are determined at equal conversion levels for pelleted catalysts produced by processes including the steps of oil-aging acid-kaolin clay masses and calcining the aged reacted masses with, and without the supplementary, intermediate combination of steps whereby carbon is deposited in situ on the internal surfaces of the pellets.

Example I

The absolute coke yield for a pelleted catalyst produced by the practices taught in the copending U.S. application of Serial No. 499,515, was ascertained by employing a sample of catalyst produced by the practices therein taught in the above-described test unit.

Georgia kaolin clay was mixed with sulfuric acid of about 93.2 percent concentration, the amount of acid used being equivalent to a dosage of about 80 percent. The mixture of clay and acid was formed into pellets about 3/16 in. long and about 3/16 in. diameter by extrusion. The extruded pellets were aged in white mineral oil, at a temperature of about 300° F., for a period of about three hours. The aged pellets were reduced in particle size to approximately 100/325 mesh to permit their use in the test unit and were calcined in an atmosphere of steam and hot flue gases containing reducing components until they were substantially desulfated, during which operation they reached a maximum temperature of about 1525° F. The coke yield was 8.7 at a conversion level of 55 percent.

Example II

To demonstrate the superior product distribution attained by applying the novel improvement within the scope of the instant invention to the process disclosed in said copending U.S. application of Serial No. 499,515, a catalyst prepared by practices within the scope of the instant invention was prepared and pulverized as in Example I and tested in the test unit.

A sample of the oil-aged acid-clay masses produced by methods described in Example I was dehydrated by heating for about 1 hour at about 550° F. in a rotary furnace, externally fired with no forced draft. The pellets were placed in a vat and soaked at about 350° F. with gas oil feedstock. The soaked pellets, after the excess soaking liquid was drained, were returned to the rotary furnace and after being heated therein at about 500° F. for an hour the blackened pellets were withdrawn and calcined. The calcination conditions were those described in Example I. The coke yield was 5.8 at a conversion level of 55 percent. These results show that the pellets of the present example are superior in their coke-reducing tendencies to those produced by said copending Robinson and Weir application.

Example III

To demonstrate that the mere promotion of porosity per se without the deposition of carbon in those pores prior to calcination is not responsible for the outstanding catalytic properties displayed by the catalyst, the procedure outlined in Example II was duplicated with exception that the aged pellets after being dehydrated for an hour at about 550° F. were calcined as in Example I. The coke yield as determined by the method described in Example I was 9.3 at a conversion level of 55 percent.

Obviously many modifications and variations of the invention as hereinbefore set forth may be made without departing from the spirit and scope thereof and, therefore, only such limitations should be imposed as are indicated in the appended claims.

We claim:

1. A method for the preparation of a hydrocarbon conversion catalyst comprising reacting kaolin clay with sulfuric acid in an amount of from 20 percent to 130 percent by weight based on the volatile free weight of said kaolin clay, at least partially dehydrating the reacted material by heating at a temperature within the range of from about 450° F. to about 1000° F. thereby to form pores in the reacted material, filling the pores thus formed in the reacted material with an organic liquid selected from the group consisting of mineral oil, gas oil, naphtha and kerosene by soaking the dehydrated material in such organic liquid, carbonizing the organic liquid contained in said pores by heating the reacted material at an elevated temperature in a reducing atmosphere, and finally desulfating said reacted material by heating in an atmosphere selected from the group consisting of steam and a mixture of steam and reducing gases at an elevated temperature within the range of from 900° F. to 1600° F. and for a time sufficient to desulfate completely said reacted material in said atmosphere.

2. The method of claim 1 in which said organic liquid is a mineral oil.

3. The method of claim 1 in which said organic liquid is gas oil.

4. The method of claim 1 in which said organic liquid is naphtha.

5. The method of claim 1 in which said organic liquid is kerosene.

References Cited in the file of this patent

UNITED STATES PATENTS

| | | |
|---|---|---|
| 1,530,392 | Morrell | Mar. 17, 1925 |
| 1,818,403 | Joseph | Aug. 11, 1931 |
| 2,485,626 | Mills | Oct. 25, 1949 |
| 2,787,599 | Belden | Apr. 2, 1957 |